Patented Mar. 10, 1925.

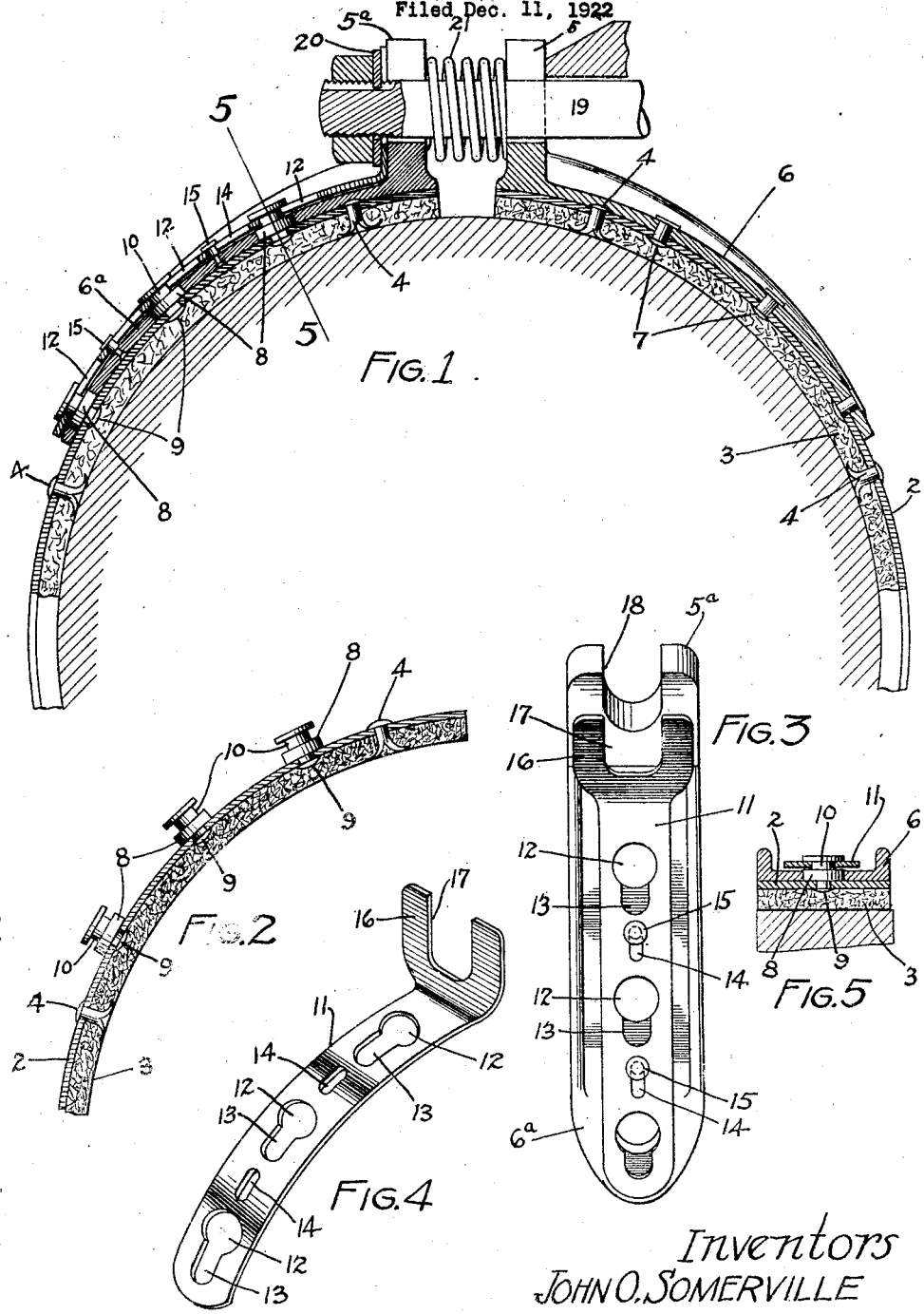

1,528,957

UNITED STATES PATENT OFFICE.

JOHN O. SOMERVILLE, OF MINNEAPOLIS, MINNESOTA.

BRAKE BAND.

Application filed December 11, 1922. Serial No. 606,084.

*To all whom it may concern:*

Be it known that I, JOHN O. SOMERVILLE, a citizen of the United States, resident of Minneapolis, county of Hennepin, and State of Minnesota, have invented certain new and useful Improvements in Brake Bands, of which the following is a specification.

It is frequently necessary to remove a brake band of a power propelled vehicle for the purpose of renewing the lining or repairing some of the parts, and in some types of cars such removal necessitates considerable time and labor in detaching and removing various mechanisms to allow the removal of the band and its re-insertion to its working position.

The invention consists generally in various constructions and combinations all as hereinafter described and particularly pointed out in the claims.

In the accompanying drawings forming part of this specification,

Figure 1, is a view partially in section of a brake band embodying my invention;

Figure 2, is a detail view of one end of the band showing the connecting lug removed;

Figure 3, is a plan view of the removable lug detached from the band;

Figure 4, is a perspective view of the locking plate mounted on the lug;

Figure 5, is a sectional view on the line 5—5 of Figure 1.

In the drawing, 2 represents a metallic brake band of ordinary construction having a suitable lining 3 secured thereto by rivets 4. A lug 5 is seated on one end of the band and has a foot plate 6 that is rigidly secured to the band by suitable means such as rivets 7. The opposite end of the band has a similar lug $5^a$ corresponding substantially to the lug 5 and having a foot-piece $6^a$, but instead of being rigidly secured to the end of the band, the foot-piece $6^a$ has comparatively large circular orifices therein at suitable intervals which are adapted to receive heads 8 formed on rivets 9 which are mounted in the end of the brake band; the heads being seated firmly on the outer surface of the band. The heads 8 are provided with annular recesses 10 which when the parts are assembled, are outside the surface of the foot-piece $6^a$.

A locking plate 11 has holes 12 therein to receive the heads 8, said holes having slotted extensions 13, the edges of which enter the annular grooves 10 and allow endwise movement of the locking plate 11, such movement being sufficient to lock the foot-piece $6^a$ firmly on the end of the band. The locking plate is also provided with guide slots 14 to receive pins 15 mounted on the foot-piece to prevent accidental separation of the locking plate and lug. The end of the locking plate adjacent the lug has an outwardly turned portion 16 having a slot 17 therein adapted to register with the corresponding slot 18 provided in both of the lugs 5 and $5^a$; said slots being U-shaped in form and adapted to receive the connecting bolt 19 by means of which the lugs and the ends of the brake-band are joined and drawn together, said bolt having the usual washers 20 and compressed spring 21.

It will be evident from an examination of this device that when the bolt 19 is loosened sufficiently to allow endwise movement of the locking plate 11 that it can be moved to its release position and the foot-piece $6^a$ and the lug $5^a$ thereon readily detached from the end of the band and the band thereupon removed from the housing by endwise movement. When the parts are reassembled again, the foot-piece of the lug $5^a$, is placed in position, the locking plate slipped up against the lug $5^a$, and when the bolt is tightened, the parts will again be rigidly connected.

I claim as my invention:

1. In combination with a brake band, a lug adapted to receive a connecting bolt and having a foot-piece seated on said band, rivets mounted in said band and having heads projecting outwardly therefrom, a locking plate having an end to fit said lug and be engaged by said bolt and provided with means for interlocking with said rivets for securing said foot-piece on said band.

2. In combination with a brake band, a lug having a foot-piece seated thereon and provided with a series of comparatively large orifices, rivets mounted in said band and having heads projecting through the orifice and said foot-piece and extending outwardly beyond the same, said heads having annular grooves therein, a locking plate having keyhole slots to receive said heads and slide longitudinally thereon, said plate having an end to fit the surface of said lug and be clamped thereon when the ends of said band are drawn together.

3. In combination with a brake band, a lug having a slot therein secured to one end of said band, a second lug detachably mounted on the other end of said brake band and also having a slot therein, a bolt fitting said slots for drawing said lugs and the ends of said band together, a locking plate mounted on said detachable lug and having means for temporarily locking said lug on said band, said plate having a slotted end to register with the slot in the adjacent lug and be engaged by said bolt for holding said locking plate in its locking position.

4. A transmission band, comprising a band of resilient material provided with studs projecting from one face, an ear formed with openings to receive the studs of the band and removable from the studs, and a fastening member to span the space between the studs and having a separable interlocking engagement with the studs to secure the ear to the band.

5. A transmission band, comprising a band of resilient material provided with studs projecting from one face, an ear formed with openings to receive the studs of the band and separable from the band, the studs of the band and openings of the ear being of such relative dimensions that the ear will be substantially non-slidable on the band longitudinally of its axis, and means spanning the space between the studs and having interlocking engagement with the studs to secure the ear to the band.

6. A transmission band comprising a band provided with studs projecting from one face, an ear separable from the band and formed with openings to receive the studs of the band, the studs and the openings being of such relative dimensions that the ear and band are substantially non-slidable one relatively to the other, and means interlocking with the studs to secure the ear in position.

In witness whereof, I have hereunto set my hand this 6th day of December, 1922.

JOHN O. SOMERVILLE.